United States Patent
Nakashima et al.

(10) Patent No.: US 7,430,649 B2
(45) Date of Patent: Sep. 30, 2008

(54) INPUT/OUTPUT DEVICE, COMPUTER, COMPUTER SYSTEM, INPUT/OUTPUT CONTROL PROGRAM, OS, PAGE MANAGEMENT PROGRAM, AND PAGE MANAGEMENT METHOD

(75) Inventors: Kohta Nakashima, Kawasaki (JP); Shinji Sumimoto, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 673 days.

(21) Appl. No.: 11/133,291

(22) Filed: May 20, 2005

(65) Prior Publication Data

US 2005/0216615 A1    Sep. 29, 2005

Related U.S. Application Data

(63) Continuation of application No. PCT/JP03/05928, filed on May 13, 2003.

(51) Int. Cl.
    G06F 12/08    (2006.01)
    G06F 13/00    (2006.01)
(52) U.S. Cl. ............... 711/203; 711/100; 711/154; 711/200; 710/22
(58) Field of Classification Search ......... 711/100, 711/154, 200, 202, 203; 710/22
    See application file for complete search history.

(56) References Cited

U.S. PATENT DOCUMENTS

| | | | | |
|---|---|---|---|---|
| 5,119,485 A | * | 6/1992 | Ledbetter et al. | 711/146 |
| 5,426,752 A | * | 6/1995 | Takahasi et al. | 711/209 |
| 5,787,487 A | * | 7/1998 | Hashimoto et al. | 711/165 |
| 6,321,293 B1 | * | 11/2001 | Fabrizio et al. | 711/113 |
| 7,017,018 B1 | * | 3/2006 | Beckett et al. | 711/159 |

FOREIGN PATENT DOCUMENTS

| | | |
|---|---|---|
| JP | 57-162164 | 10/1982 |
| JP | 02-238535 | 9/1990 |
| JP | 06-175927 | 6/1994 |

OTHER PUBLICATIONS

International Search Report mailed Aug. 12, 2003.

* cited by examiner

*Primary Examiner*—Tuan V. Thai
(74) *Attorney, Agent, or Firm*—Staas & Halsey LLP

(57) ABSTRACT

A computer system including input/output devices that transfer data and a computer that controls a process using a virtual storage and inputs data to and outputs data from a medium, wherein the input/output devices and the computer include address conversion tables for converting a virtual address into an actual address, the computer requests all the input/output devices to permit page operation such as page-out processing, processing for deleting a virtual address space following termination of a process, and processing for changing a page, the input/output devices perform operation for the address conversion tables in response to a request from the computer and notifies the computer of permission of the page operation, and, when the permission for the page operation is obtained from all the input/output devices, the computer performs operation for the address conversion table and performs page operation.

19 Claims, 6 Drawing Sheets

| PAGE | ENTRY 1 | ENTRY 2 | ENTRY 3 | ENTRY 4 | ENTRY 5 |
|------|---------|---------|---------|---------|---------|
| 0x00 |         |         |         |         |         |
| 0x01 | 115     | 140     | 163     | 204     | 103     |
| 0x02 | 206     | 102     | 116     | 141     | 153     |
| 0x03 |         |         |         |         |         |

INPUT/OUTPUT DEVICE, COMPUTER, COMPUTER SYSTEM, INPUT/OUTPUT CONTROL PROGRAM, OS, PAGE MANAGEMENT PROGRAM, AND PAGE MANAGEMENT METHOD

CROSS REFERENCE TO RELATED APPLICATIONS

This is a continuing application, filed under 35 U.S.C. §111(a), of International Application PCT/JP03/05928, filed May 13, 2003.

TECHNICAL FIELD

The present invention relates to an input/output device, a computer, a computer system, an input/output control program, an OS, a page management program, and a page management method that, when input/output using virtual addresses is applied to a memory area in a computer system having a virtual storage, realize grant of authorization for page operation such as page out processing, deletion processing for a virtual address space following termination of a process, and page changing processing to the input/output device side.

BACKGROUND ART

First, a structure of a computer system will be explained. FIG. 8 is a block diagram showing an example of the structure of the computer system. The computer system shown in FIG. 8 includes a computer including a CPU (Central Processing Unit) 1 and a memory 2, an input/output device (a disk controller) 4, an input/output device (an NIC (Network Interface Card)) 5, a disk 3, and a communication path 6.

The CPU 1 performs control for the computer by executing an OS (Operating System). The input/output devices 4 and 5 are devices for inputting data to and outputting data from media and perform input/output processing by executing an input/output control program. Here, the media means the disk 3 and the communication path 6. The input/output device 4 is a device for performing data input/output between the memory 2 and the disk 3. The input/output device 5 is a device for performing data input/output between the memory 2 and the communication path 6. It is assumed that the computer system performs virtual storage. Here, storages for performing the virtual storage include a main storage and an external storage. The main storage is the memory 2 and the external storage is the disk 3.

In the computer system having the virtual storage, a process designates a memory area that is accessed using virtual addresses. Therefore, the OS manages storage areas of the storages.

Here, actual addresses and virtual addresses will be explained. The actual addresses are addresses allocated to the storages. The virtual addresses are addresses that are used by a process and an input/output control program instead of the actual addresses. The OS converts the virtual addresses to the actual addresses using an address conversion table as required, whereby reading and writing in the actual addresses of the storages are performed. The address conversion table is a table associating the virtual addresses and the actual addresses. In the address conversion table, when the actual addresses corresponding to the virtual addresses indicate physical pages, this represents that pages corresponding to the virtual addresses are paged in. The physical pages are pages actually presenting on a memory among pages. When the actual addresses corresponding to the virtual addresses are identifiers of swap areas of a disk, this represents that pages corresponding to the virtual addresses are paged out. In addition, when the actual addresses corresponding to the virtual addresses are NULL, this indicates that there are no entities of pages corresponding to the virtual addresses.

On the other hand, the input/output device designates the memory areas using the actual addresses in accessing the memory areas. Therefore, when the input/output device inputs data to and outputs data from a memory area designated by a program, it is necessary to use one of two input/output methods described below.

First, a first input/output method will be explained. The OS prepares an input/output dedicated area serving as a memory area dedicated to input/output, which is not paged out at the time of initialization of the OS, and notifies the input/output control program of an actual address of the input/output dedicated area. The input/output control program performs input/output using only the notified input/output dedicated area.

When the input/output device performs output, the CPU copies output data from the memory area designated by the program to the input/output dedicated area. The input/output control program reads the output data from the input/output dedicated area. On the other hand, when the input/output device performs input, the input/output control program writes input data in the input/output dedicated area. The CPU copies the input data from the input/output dedicated area to the memory area designated by the program.

Next, a second input/output method will be explained. The OS pins down (page-locks) a page including a memory area used for input/output of data every time input/output processing is performed such that the page is not paged out and notifies the input/output control program of an actual address of this memory area. The input/output control program applies input/output to the memory area directly.

Reasons for pinning down the page including the memory area used for data input/output in the second input/output method are as described below. First, in the computer system for performing virtual storage, the physical pages are not always present for storage areas on the virtual address space. In addition, the correspondence between the virtual addresses and the actual addresses may change. However, when all the memory areas are pinned down, it is impossible to expand memory areas with page out processing when the physical pages are insufficient. Therefore, a quantity of physical pages, which can be pinned down, is limited to some extent. Therefore, basically, it is necessary to pin down memory areas every time input/output processing is performed.

The first input/output method is implemented in many computer systems. This is because, since time for copying input/output data in a memory is short compared with time required for input/output of data, copy processing does not cause a large overhead in terms of performance. In addition, this is because, if memory areas are pinned down every time input/output processing is performed as in the second input/output method, the input/output processing becomes complicated.

On the other hand, in a high-speed input/output device, in particular, a high-speed communication path with speed exceeding 1 Gbps, since an overhead for copying input/output data is large compared with time required for input/output, there is an example in which data transfer is implemented by the second input/output method.

As an implementation example, there is a PM library (reference 1) serving as a communication library of the Myrinet that is one of high-speed communication paths. In the PM library, in addition to the second input/output method, a pinned-down memory area is cached without being released immediately after input/output to reduce the number of times of pin-down processing and a limitation for pinning down a memory area, in which input processing such as data reception is possible, in advance is imposed to control occurrence of interruption (reference 2).

Reference 1: Hiroshi Tezuka, Atsushi Hori, and Yuu Ishikawa: "Design and Implementation of Work Station Cluster Communication Library PM", Parallel Processing Symposium JSPP '96, pp. 41 to 48 (1996).

Reference 2: H. Tezuka, F. 'Carroll, A. Hori, and Y. Ishikawa, "Pin-down Cache: A Virtual Memory Management Technique for Zero-copy Communication", First Merged Symposium IPPS/SPDP 1998 $12^{th}$ International Parallel Processing Symposium & $9^{th}$ Symposium on Parallel and Distributed Processing, 1998.

In the conventional techniques, the OS has management information of the address conversion table. In other words, the OS takes the initiative in performing page operation such as page-in and page-out of respective pages and page management such as pin-down and release of pin-down. Therefore, it is generally difficult to detect, from the input/output device side, to which page having an actual address an input/output object memory area designated by a virtual address correspond and whether an actual address is currently allocated to a physical page. This makes it necessary to use the first input/output method or the second input/output method.

However, the first input/output method has problems described below. First, in particular, when input/output is performed using a high-speed input/output device, it is a significant problem in that the copy processing performed in the first input/output processing has a large overhead for copy of input/output data compared with time required for input/output. In addition, when a size of data attempted to be inputted/outputted at a time is larger than a size of the input/output dedicated area, it is necessary to transfer the data in plural times.

The second input/output method has problems described below. First, basically, the pin-down processing is performed every time the input/output processing is performed. In addition, when a request for input/output is issued from the input/output device side, in general, it is necessary to cause interruption in order to request the OS to perform the pin-down processing.

In many computer systems, in performing page-out processing, computer access information recording a state of access of the computer to pages is acquired, significance is given to the respective pages in accordance with the computer access information, and the pages are selected as objects of page-out in order from one with low significance. However, since a state of access of the input/output device to the pages is not taken into account, it is impossible to select objects of page-out in accordance with the state of access of the input/output device.

The invention has been devised to solve such problems and it is an object of the invention to provide an input/output device, a computer, a computer system, an input/output control program, an OS, a page management program, and a page management method that can improve performance of the computer system after execution of page-out processing by reducing an overhead of the pin-down processing and selecting page-out object pages by reflecting a state of access of an input/output device to pages on the selection.

DISCLOSURE OF THE INVENTION

The invention provides an input/output device for transferring data between a memory of a computer having a virtual storage and a medium, including: an input/output device address converting section that holds an address conversion table for each process provided from a computer in order to convert a virtual address into an actual address, performs operation for the address conversion table in response to a request from the computer, and converts the virtual address into the actual address using the address conversion table when the input/output device accesses the memory; an input data analyzing section that analyzes data inputted from the medium and provides the computer with a result of the analysis; a data transfer section that transfers data using the actual address; and a page operation permitting section that instructs the input/output device address converting section to operate the address conversion table in response to a request from the computer and notifies the computer of permission for page operation.

According to such a constitution, since the input/output device gives permission for page operation to the computer, the input/output device can obtain authority for the page operation.

The input/output device according to the invention is characterized by further including an input/output device access information managing section that records input/output device access information, which is a state of access from the input/output device to the memory, and provides the computer with the input/output device access state in response to a request from the computer, and in that, when the page operation is page-out processing, the page operation permitting section judges whether the page-out processing is permitted on the basis of the input/output device access information and, when it is judged that the page-out processing is permitted, instructs the input/output device address converting section to operate the address conversion table and notifies the computer of the permission of the page-out processing.

According to such a constitution, since the input/output device judges propriety of permission of page-out processing that has been conventionally performed by the computer every time input/output processing is performed, it is possible to reduce an overhead of the pin-down processing every time the input/output processing is performed. In addition, since a page to be paged out is selected by reflecting a state of access from the input/output device to pages on the selection, it is possible to prevent pages, which are frequently accessed from the input/output device, from being paged out.

The invention provides a computer for controlling a process using a virtual storage and inputting data to and outputting data from media via input/output devices, including: an input/output area designating section that designates an input/output area, which is a memory area for performing input/output of data, with a virtual address; a computer address converting section that generates, for each process, an address conversion table for converting the virtual address, which indicates the memory area, into an actual address and provides the input/output devices with the address conversion table, performs operation for the address conversion table, and converts the virtual address into the actual address using the address conversion table when the computer accesses the memory; and a page operating section that requests all the input/output devices to permit page operation and, when permission for the page operation is obtained from all the input/ output devices, instructs the computer address converting section to operate the address conversion table and performs the page operation.

According to such a constitution, since the input/output devices give permission for page operation to the computer, the input/output devices can hold authority for the page operation.

The computer according to the invention is characterized by further including: a computer access information managing section that records computer access information, which is a state of access from the computer to the memory, and provides the computer access information as required; and a page-out object selecting section that acquires the computer access information from the computer access information managing section, acquires input/output device access information, which is a state of access from the input/output devices to the memory, from all the input/output devices, calculates significance of pages on the basis of the computer access information and all the pieces of input/output device access information, and selects a page with low significance as an object of page-out processing.

According to such a constitution, since an object of the page-out processing is selected by reflecting input/output access information on the selection in addition to computer access information, a page with low significance is selectively paged out. Thus, it is possible to improve performance of the entire system.

The computer according to the invention is characterized in that, in calculating the significance, the page out object selecting section weights the respective pieces of input/output device access information in accordance with weights of the respective input/output devices given in advance.

According to such a constitution, it is possible to improve reliability of page-out object selection by, for example, putting a larger weight on the input/output devices that are used frequently.

The invention provides a computer system including input/output devices that transfer data and a computer that controls a process using a virtual storage and inputs data to and outputs data from a medium, the input/output devices including: an input/output device address converting section that holds an address conversion table for each process provided from a computer in order to convert a virtual address into an actual address, performs operation for the address conversion table in response to a request from the computer, and converts the virtual address into the actual address using the address conversion table when the input/output device accesses the memory; an input data analyzing section that analyzes data inputted from the medium and provides the computer with a result of the analysis; a data transfer section that transfers data using the actual address; and a page operation permitting section that instructs the input/output device address converting section to operate the address conversion table in response to a request from the computer and notifies the computer of permission for page operation, and the computer including: an input/output area designating section that designates an input/output area, which is a memory area for performing input/output of data, with a virtual address; a computer address converting section that generates, for each process, an address conversion table for converting the virtual address, which indicates the memory area, into an actual address and provides the input/output devices with the address conversion table, performs operation for the address conversion table, and converts the virtual address into the actual address using the address conversion table when the computer accesses the memory; and a page operating section that requests all the input/output devices to permit page operation and, when permission for the page operation is obtained from all the input/output devices, instructs the computer address converting section to operate the address conversion table and performs the page operation.

According to such a constitution, since the input/output devices give permission for page operation to the computer, the input/output devices can hold authority for the page operation.

The computer system according to the invention is characterized in that the page operation is page-out processing, processing for deleting a virtual address space following termination of a process, and processing for changing a page.

According to such a constitution, since the input/output devices give permission for page operation to the computer, the input/output devices can hold authority for page operation.

The invention provides an input/output control program stored in a medium readable by an input/output device in order to perform transfer of data between a memory and a medium in an OS having a virtual storage, the input/output control program causing the input/output device to execute: holding an address conversion table for each process that is provided from the OS in order to convert a virtual address into an actual address; analyzing data inputted from the medium and providing a result of the analysis to the OS; converting the virtual address into the actual address using the address conversion table when the input/output control program accesses the memory; transferring the data using the actual address; and operating the address conversion table in response to a request from the OS and notifying the OS of permission of page operation.

According to such a constitution, since the input/output device gives permission for page operation to the computer, the input/output device can hold authority for page operation.

The invention provides an OS stored in a medium readable by a computer in order to control a process using a virtual storage and input data to and output data from media via input/output control programs, the OS causing the computer to execute: designating an input/output area, which is a memory area for performing input/output of data, with a virtual address; generating, for each process, an address conversion table for converting the virtual address indicating the memory area into an actual address and providing the input/output control programs with the address conversion table; requesting all the input/output control programs to permit page operation; and, when permission for the page operation is obtained from all the input/output control programs, operating the address conversion table and performing the page operation.

According to such a constitution, since the input/output device gives permission for page operation to the computer, the input/output device can hold authority for the page operation.

The invention provides a page management program including input/output control programs for transferring data and an OS for controlling a process using a virtual storage and inputting data to and outputting data from a medium, the input/output control programs including: holding an address conversion table for each process that is provided from the OS in order to convert a virtual address into an actual address; analyzing data inputted from the medium and providing a result of the analysis to the OS; converting the virtual address into the actual address using the address conversion table when the input/output control program accesses a memory; transferring the data using the actual address; instructing operation for the address conversion table in response to a request from the OS and notifying the OS of permission of page operation; and operating the address conversion table in response to a request from the OS, and the OS including: designating an input/output area, which is a memory area for performing input/output of data, with a virtual address; generating, for each process, an address conversion table for converting the virtual address indicating the memory area into an actual address and providing the input/output control programs with the address conversion table; converting the virtual address into the actual address using the address conversion table when the computer accesses the memory; requesting all the input/output control programs to permit page operation; and, when permission for the page operation is obtained from all the input/output control programs, operating the address conversion table and performing the page operation.

According to such a constitution, since the input/output device gives permission for page operation to the computer, the input/output device can hold authority for the page operation.

The invention provides a page management method in a computer system including input/output devices for transferring data and a computer for controlling a process using a virtual memory and inputting data to and outputting data from a medium, the page management method including: generating, for each process, an address conversion table for converting a virtual address, which indicates the memory area, into an actual data in the computer and providing the input/output devices with the address conversion table; holding the address conversion table for each process provided from the computer in the input/output devices; analyzing data inputted from the medium in the input/output devices and providing the computer with a result of the analysis; designating an input/output area, which is a memory area for performing input/output of data, with a virtual address; converting the virtual address into the actual address using the address conversion table when the input/output devices access the memory; converting the virtual address into the actual address using the address conversion table when the computer accesses the memory; transferring data using the actual address; requesting all the input/output devices to permit page operation in the computer; operating the address conversion table in response to a request from the computer in the input/output device and notifying the computer of permission of the page operation; and operating the address conversion table in the computer when permission for the page operation is obtained from all the input/output devices and performing the page operation.

According to such a constitution, since the input/output devices give permission for page operation to the computer, the input/output devices can hold authority for the page operation.

BEST MODE FOR CARRYING OUT THE INVENTION

Figure 1:
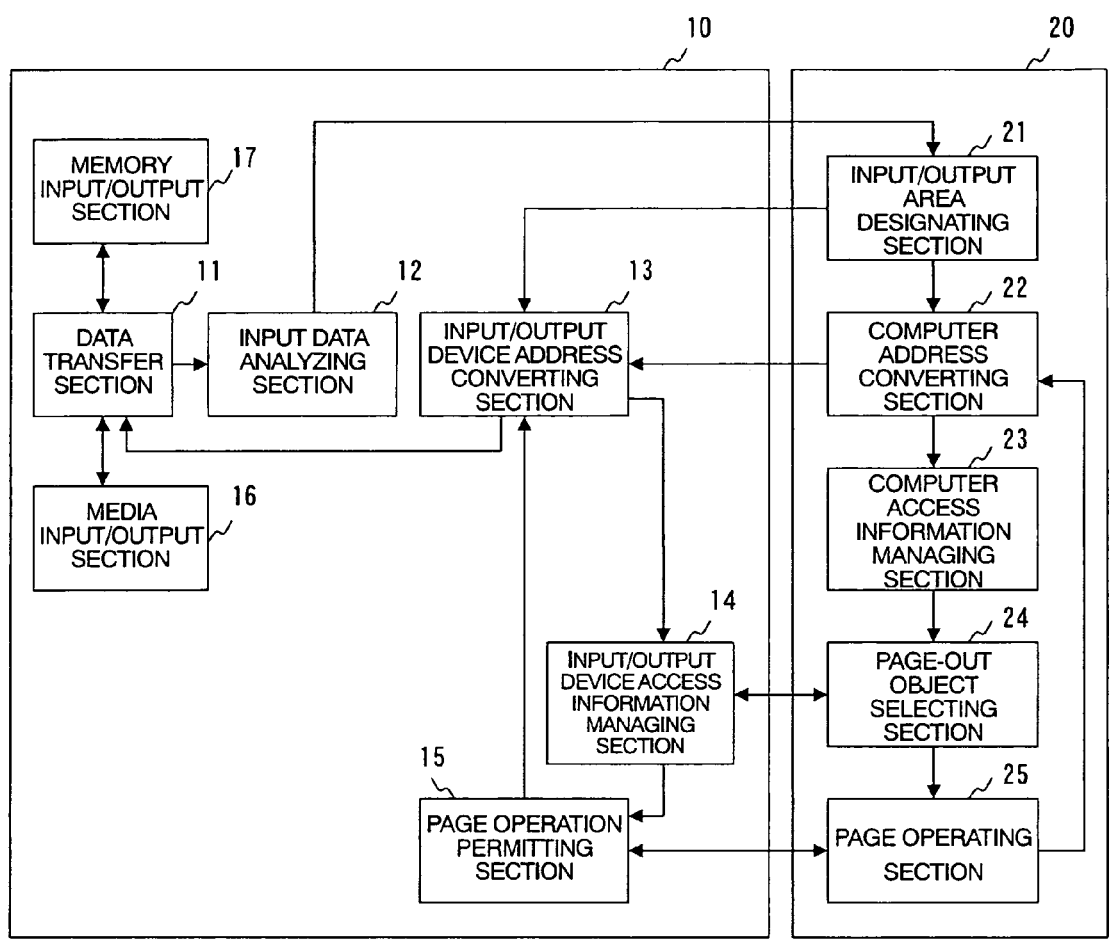
FIG. 1 is a block diagram showing an example of a structure for a function of a page management program in the invention.

An embodiment of the invention will be hereinafter explained in detail with reference to the drawings. FIG. 1 is a block diagram showing an example of a structure for a function of a page management program in the invention. The page management program includes an input/output control program 10 and an OS 20. The input/output control program 10 includes a data transfer section 11, an input data analyzing section 12, an input/output device address converting section 13, an input/output device access information managing section 14, a page operation permitting section 15, a media input/output section 16, and a memory input/output section 17. The OS 20 includes an input/output area designating section 21, a computer address converting section 22, a computer access information managing section 23, a page-out object selecting section 24, and a page operating section 25. Respective input/output devices in a computer system include the input/output control program 10.

The media input/output section 16 reads data from and writes data in media such as a disk and a communication path. The memory input/output section 17 reads data from and writes data in a memory 2. The input/output device address converting section 13 and the computer address converting section 22 hold address conversion tables with the same content. Respective processes have virtual address spaces, respectively, and the address conversion tables are generated by a unit of process. In other words, when two processes are present, there are two address conversion tables.

Next, operations of the input/output control program 10 and the OS 20 will be explained. First, input processing will be explained. The data transfer section 11 outputs header information and the like of input data, which is received via the media input/output section 16, to the input data analyzing section 12. The input data analyzing section 12 analyzes the header information and the like and outputs a result of the analysis to the input/output area designating section 21. The input/output area designating section 21 designates a memory area, in which the input data is written, with a virtual address according to the result of the analysis and notifies the input/output device address converting section 13 of the memory area. The input/output device address converting section 13 converts a virtual address, which is designated with reference to the address conversion table, into an actual address and passes the actual address to the data transfer section 11 and the input/output device access information managing section 14. The data transfer section 11 writes the input data in the designated actual address via the memory input/output section 17. At the same time, for each page including the designated actual address, the input/output device access information managing section 14 records time of access by the input/output device in an input/output device access information recording table as input/output device access information.

Next, output processing will be explained. The input/output area designating section 21 designates a memory area, in which output data is read, with a virtual address and notifies the input/output device address converting section 13 of the memory area. The input/output device address converting section 13 converts the designated virtual address into an actual address and passes the actual address to the data transfer section 11 and the input/output device access information managing section 14. The data transfer section 11 reads the output data from the designated actual data via the memory input/output section 17 and outputs the output data to the media via the media input/output section 16. At the same time, for each page including the designated actual address, the input/output device access information managing section 14 records time of access by the input/output device in the input/output device access information recording table.

Next, page operation performed by the OS 20 will be explained. As the page operation, the OS 20 can register a physical page in the address conversion table, deletes a physical page from the address conversion table, and change the address conversion table. The respective actions of the page operation will be hereinafter explained in detail.

First, the registration of a physical page in the address conversion table will be explained. When a paged-out storage area is paged in or when a page is allocated anew to a page to which a physical page is not allocated, the registration of a physical page in the address conversion table is performed. In this case, the page operating section 25 secures a physical page and instructs the computer address converting section 22 to register the physical page. The computer address converting section 22 registers the physical page in an actual address of a corresponding page in the address conversion table. At this point, the address conversion table of the input/output device address converting section 13 is not updated.

If a physical page is registered in an actual address and reading and writing operation is permitted when the input/output device address converting section 13 refers to the address conversion table, the input/output device address converting section 13 applies input/output processing to an object memory area. However, if a physical page is not registered in an actual address or if writing is impossible, the input/output device address converting section 13 generates interruption and sends an inquiry to the computer address converting section 22.

When the storage area is paged out, the computer address converting section 22 pages in the storage area and notifies the input/output device address converting section 13 of an actual address obtained as a result of the page-in. When a physical page is not allocated to the storage area, the computer address converting section 22 allocates a physical page to the storage area and notifies the input/output device address converting section 13 of an actual address obtained as a result of the allocation of the physical page. When a page is already present in the storage area, the computer address converting section 22 notifies an actual address to the input/output device address converting section 13. In addition, when writing in the storage area is impossible because of a reason in memory protection and the like, the computer address converting section 22 notifies the input/output device address converting section 13 that writing in the storage area is impossible. When the storage area is an object storage area of copy-on-write operation, the computer address converting section 22 performs the copy-on-write operation and notifies the input/output device address converting section 13 of an actual address obtained as a result of the copy-on-write operation.

Figure 2:
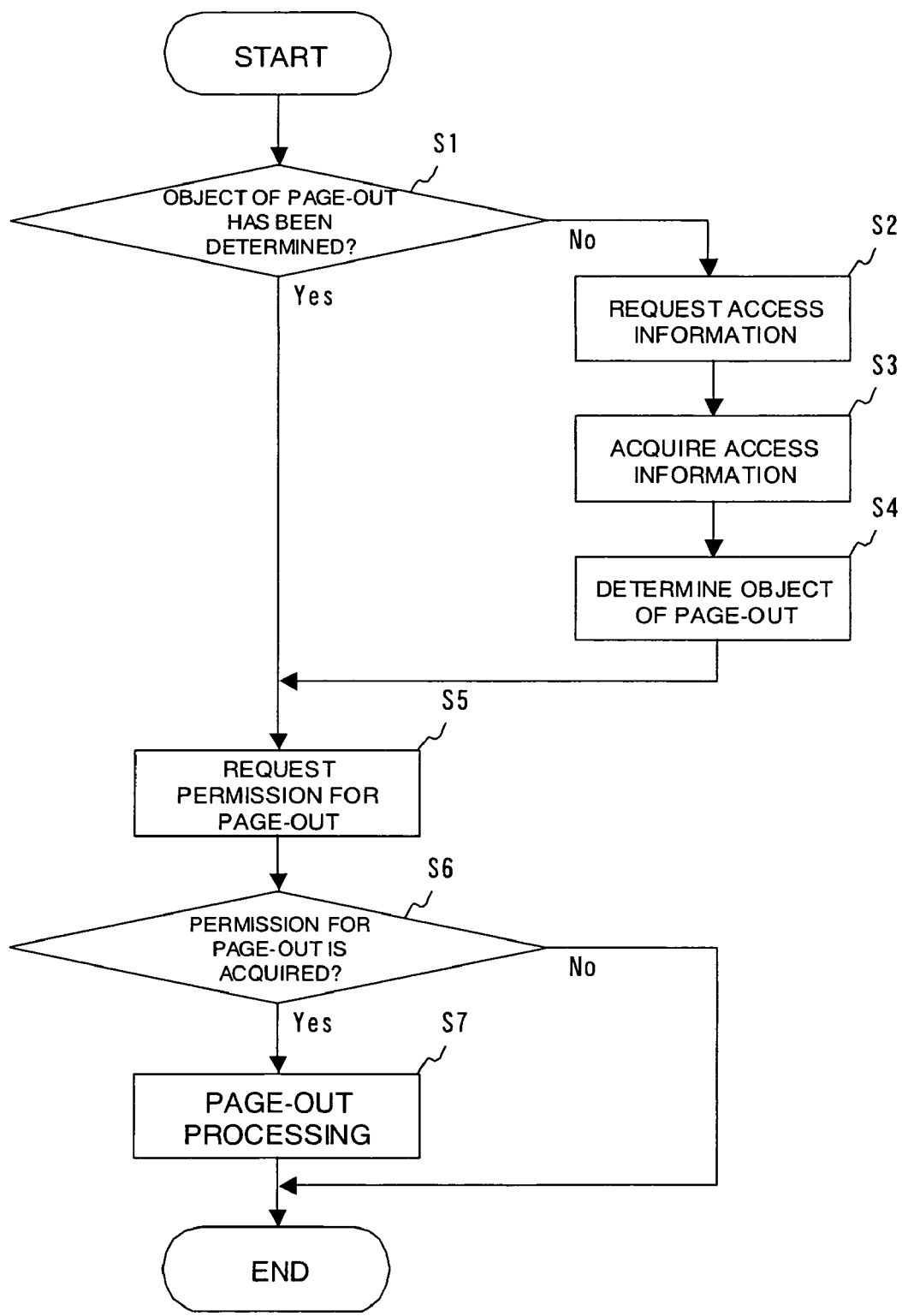
FIG. 2 is a flowchart showing an example of an operation of an OS in page-out processing.
Figure 3:
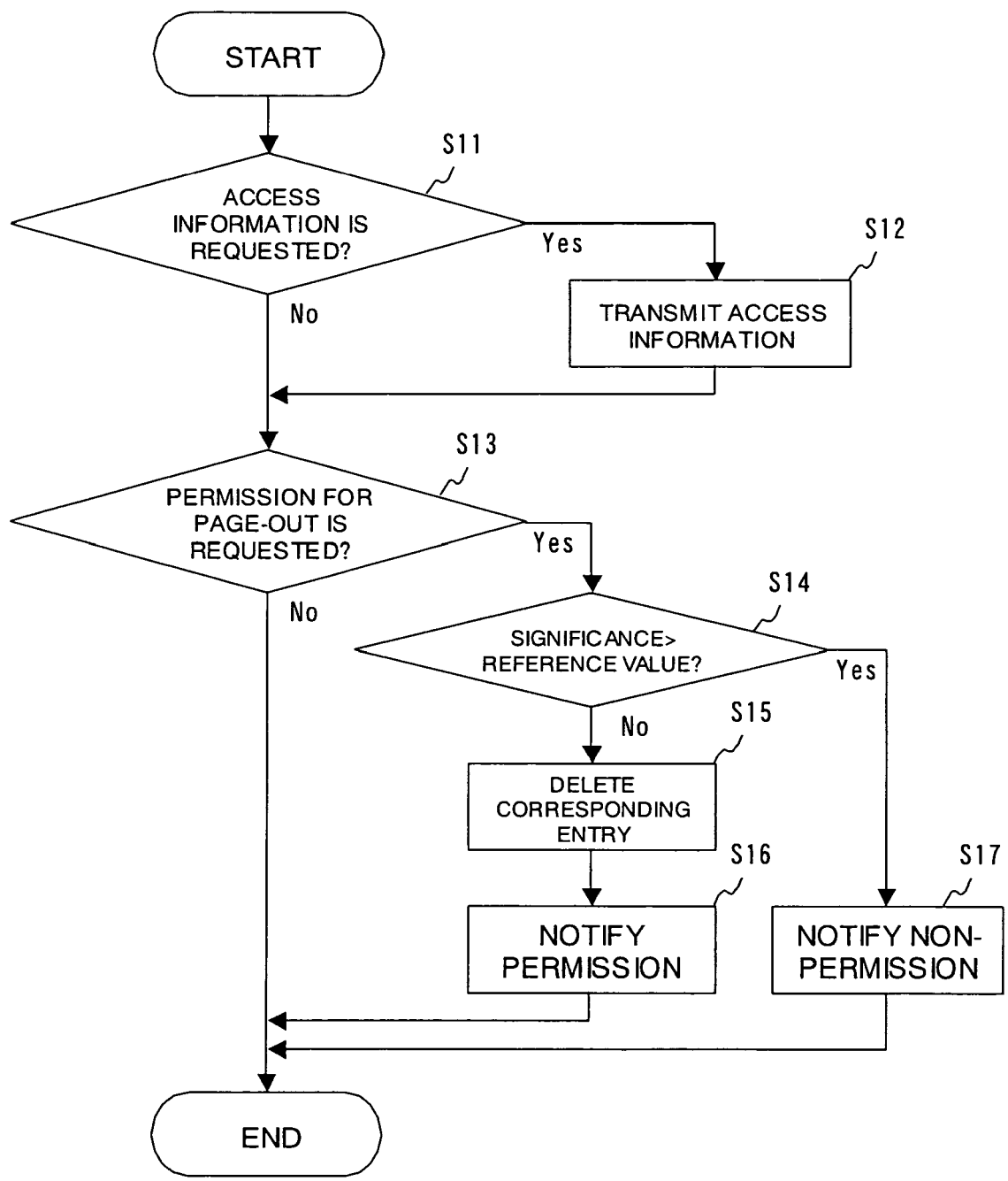
FIG. 3 is a flowchart showing an example of an operation of an input/output control program in the page-out processing.

Next, the deletion of a physical page from the address conversion table will be explained. The deletion of a physical page includes page-out processing and deletion of a virtual address space. First, the page-out processing will be explained with reference to FIGS. 2 and 3. FIG. 2 is a flowchart showing an example of an operation of the OS in the page-out processing. FIG. 3 is a flowchart showing an example of an operation of the input/output control program in the page-out processing.

When there is no free space in the memory, the page operating section 25 performs page-out. At this point, if an object of the page-out is not determined (S1, No), the page-out object selecting section 24 requests the input/output device access information managing sections 14 of the respective input/output control programs 10 to transmit access information (S2).

The input/output device access information managing section 14 requested to transmit access information (S11, Yes) transmits input/output device access information to the page-out object selecting section 24 (S12). If the input/output device access information managing section 14 is not requested to transmit access information (S11, No), the input/output control program shifts to processing S13.

Next, the page-out object selecting section 24 acquires the input/output device access information from the input/output device access information managing sections 14 of each input/output control programs 10 (S3). Next, the page-out object selecting section 24 weights the respective pieces of input/output device access information in accordance with weights of the respective input/output devices given in advance and calculates significances of the respective pages using the weighted respective pieces of input/output device access information and computer access information. Here, the computer access information managing section 23 records time of access by the computer, which is obtained by the computer address converting section 22, in the computer access information recording table as computer access information in the same procedure as the input/output device access information managing section 14.

The page-out object selecting section 24 selects pages as page-out objects in order from pages with low significance by a quantity equivalent to memory areas that are desired to be paged out (S4) and outputs the pages to the page operating section 25. When an object page of page-out is determined (S1, Yes), the page operating section 25 request the page operation permitting sections 15 of the respective input/output control programs 10 to permit page-out (S5).

The operation permitting section 15 requested to permit page-out (S13, Yes) acquires significance of the page from the input/output device access information managing section 14 and judges whether the significance exceeds a predetermined reference value (S14). When the input/output device access information managing section 14 is requested to calculate significance of the page by the page operation permitting section 15, the input/output device access information managing section 14 calculates significance for the page using input/output device access information and passes the significance to the page operation permitting section 15.

If the significance does not exceed the reference value (S14, No), the page operation permitting section 15 instructs the input/output device address converting section 13 to delete a corresponding entry. After the input/output device address converting section 13 deletes the corresponding entry from the address conversion table (S15), the page operation permitting section 15 notifies the page operating section 25 of permission of page-out (S16) and ends this flow. On the other hand, if the significance exceeds the reference value (S14, Yes), the page operation permitting section 15 notifies the page operating section 25 of non-permission of page-out (S17) and ends this flow.

If the page operating section 25 acquires permission for page-out from all the input/output control programs 10 (S6, Yes), the page operating section 25 instructs the computer address converting section 22 to delete a corresponding entry. After the compute address converting section 22 deletes the corresponding entry from the address conversion table, the page operating section 25 performs page-out processing (S7) and ends this flow. On the other hand, if the page operating section 25 could not receive permission for page-out from all the input/output control programs 10 (S6, No), the page operating section 25 ends this flow without performing page-out processing.

Figures 4, 5:
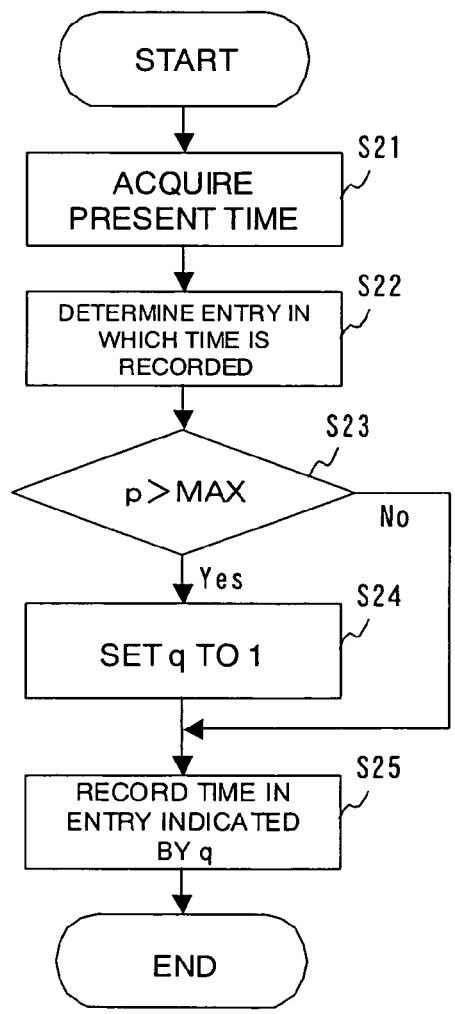
FIG. 4 is a diagram showing an example, of an access information recording table.
FIG. 5 is a flowchart showing an example of recording of access information.

Next, an example of the recording of access information will be explained. The access information recording table holds maximum n pieces of time of input/output processing for respective pages with predetermined time as a reference. FIG. 4 is a diagram showing an example of the access information recording table that holds five pieces of time for each page.

FIG. 5 is a flowchart showing an example of the recording of access information. First, when input/output operation for a page is performed, the input/output device access information managing section 14 acquires present time (S21). Next, the input/output device access information managing section 14 determines an entry in which the time is recorded (S22). Here, when it is assumed that an entry having recorded therein the previous time is p, an entry, in which the present time is recorded, is determined as p+1.

If the entry p having recorded therein the previous time is within a last entry MAX of the access information recording table (S23, No), the input/output device access information managing section 14 records the present time in the entry indicated by q (S25) and ends this flow. On the other hand, if the entry p having recorded therein the previous time is the last entry MAX of the access information recording table (S23, Yes), the input/output device access information managing section 14 sets the entry q, in which the present time is recorded, as an entry 1 (S24) and shifts to processing S25.

When time is recorded in accordance with the flow described above, for example, in FIG. 4, if time is recorded in the entry 1 last time, time is recorded in an entry 2 this time. If time is recorded in an entry 5 last time, time is recorded in the entry 1 this time. In other words, time recorded five times earlier is overwritten.

Next, an example of the calculation of significance of a page will be explained. First, the page out object selecting section 24 acquires present time t0. Next, the page out object selecting section 24 calculates values of significance using an evaluation function for the respective pieces of time ti recorded as access information of a page of attention and accumulates the values of significance concerning the respective pieces of time. Here, i indicates the number of entries having time recorded therein. For example, a page $0_x01$ shown in FIG. 4 has five entries having time recorded therein. A value of significance using an evaluation function f is calculated by $f(ti-t0)$. Note that, as the evaluation function f, a function, an x axis of which increases monotonously in a negative region and takes a positive value, is used. The evaluation function is, for example, $f(x)=\exp(x)$, $f(x)=-1/x$. Giving the page $0_x01$ shown in FIG. 4 as an example, $f(ti-t0)$ is calculated for time from the entry 1 to the entry 5 and all results of the calculation are accumulated, whereby significance of the page $0_x01$ is calculated. When significances of plural pages are necessary, significances are calculated for all the pages.

As described above, since the OS performs the page-out processing only when permission is acquired from all input/output devices, it is possible to prevent address conversion tables provided in the input/output devices from having invalid values. Since an object page of page-out is determined on the basis of input/output device access information, even in a page that has low significance judging only from computer access information, when the page is frequently accessed form the input/output devices, it is possible to prevent decline in performance due to access from the input/output devices to the memory. In addition, it is possible to page out pages with lower significance and improve performance of the entire computer system.

Note that, in this embodiment, the page out object selecting section 24 calculates significances of the respective pages using respective pieces of weighted input/output device access information and computer access information. However, it is also possible that, when access information is requested, the input/output device access information managing section 14 and the computer access information managing section 23 calculate significances of respective pages using access information of the managing sections, respectively, collect pages, significances of which do not exceed a predetermined value, to form low significance page information, and transmit the low significance page information to the page out object selecting section 24.

In this embodiment, page-out is permitted when significance of a page does not exceed the reference value. However, the page-out may be permitted with delay if, at a point when a request for permission is received, significance of a corresponding page does not exceed the reference value but the corresponding page is being accessed.

Figure 6:
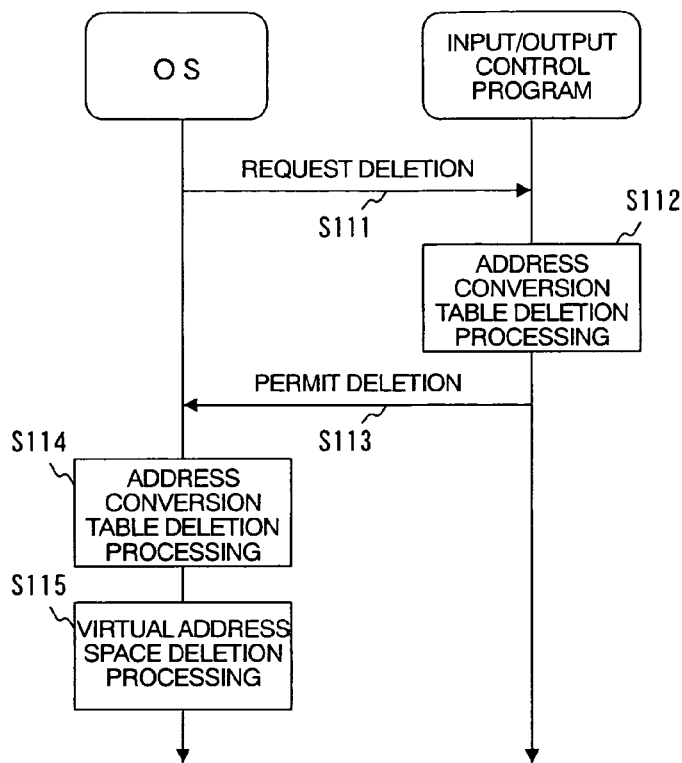
FIG. 6 is a sequence diagram showing an example of operations of the OS and the input/output control program in virtual address space deletion processing.

Next, deletion of a virtual address space due to termination of a process in the deletion of a physical page from the address conversion table will be explained. FIG. 6 is a sequence diagram showing an example of operations of the OS and the input/output control program in the virtual address space deletion processing.

When a certain process is terminated, the page operating section 25 of the OS requests the page operation permitting sections 15 of the respective input/output control programs 10 to delete a corresponding virtual address space (S111).

The page operation permitting section 15, which has received the deletion request, instructs the input/output device address converting section 13 to delete an address conversion table for the corresponding virtual address space. Next, the input/output device address converting section 13 deletes a corresponding address conversion table (S112). Next, the page operation permitting section 15 notifies the page operating section 25 of permission of deletion of the virtual address space (S113).

When the page operating section 25 acquires the permission for deletion of the virtual address space from all the input/output control programs 10, the page operating section 25 instructs the computer address converting section 22 to delete an address conversion table for a corresponding virtual address space. The computer address converting section 22 deletes a corresponding address conversion table (S114). The page operating section 25 deletes the corresponding virtual address space (S115) and ends this sequence.

As described above, only when the permission is acquired from all the input/output devices, the OS deletes an address conversion table. Thus, it is possible to prevent inconsistency between address conversion tables held by the input/output devices and an address conversion table held by the OS when a virtual address space is terminated.

Figure 7:
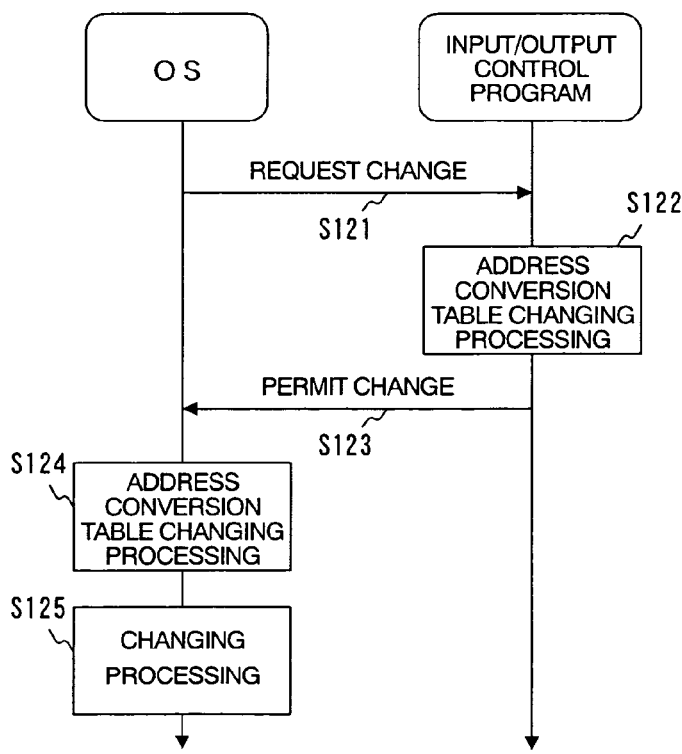
FIG. 7 is a sequence diagram showing an example of operations of the OS and the input/output control program in address conversion table changing processing.
Figure 8:
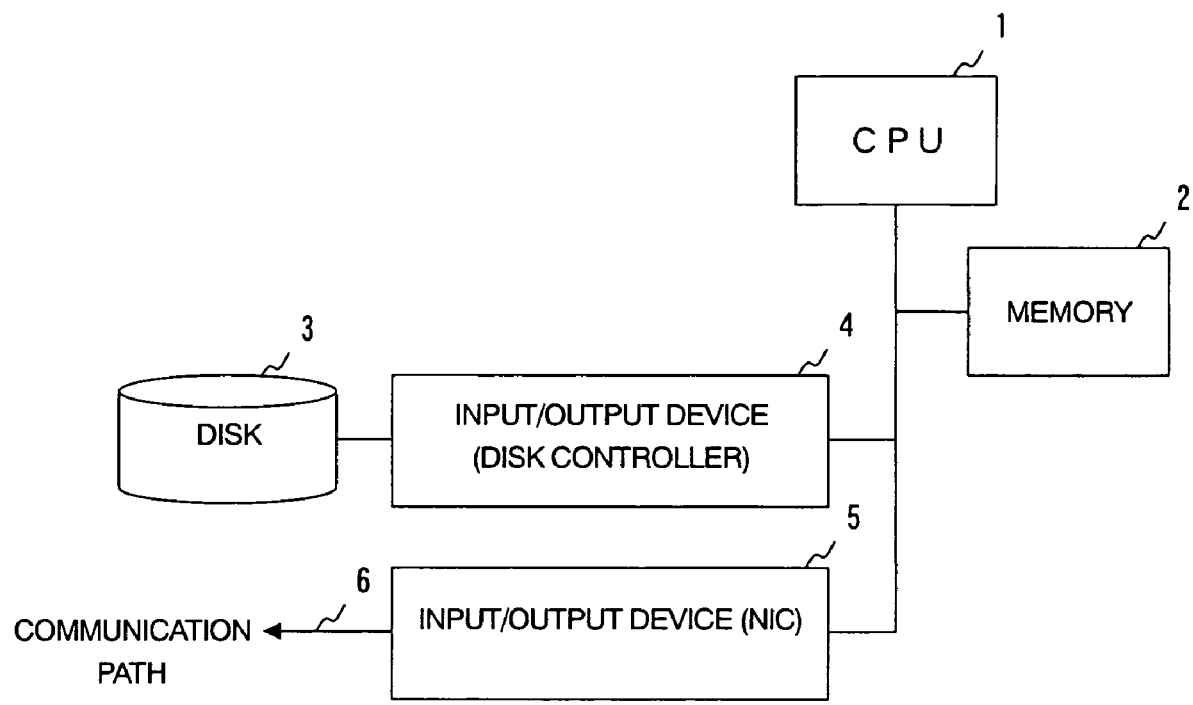
FIG. 8 is a block diagram showing an example of a structure of a computer system.

Next, a change of an address conversion table will be explained. FIG. 7 is a sequence diagram showing an example of operations of the OS and the input/output control program in the address conversion table changing processing.

When a corresponding actual address is changed by copy-on-write processing or the like or when information on protection attribute for a page (writable or unwritable) is changed, the page operating section 25 of the OS requests the page operation permitting section 15 of the input/output control program to change an address conversion table (S121).

The page operation permitting section 15, which has received the request for change, instructs the input/output device address converting section 13 to change a corresponding entry in the address conversion table. Next, the input/output device address converting section 13 changes the address conversion table (S122). Next, the page operation permitting section 15 notifies the page operating section 25 of permission for change (S123).

When the page operating section 25 acquires the permission for change from all the input/output control devices, the page operating section 25 instructs the computer address converting section 22 to change a corresponding entry in the address conversion table. The computer address converting section 22 changes the address conversion table (S124). The page operating section 25 performs changing processing involved in the change of the address conversion table (S125) and ends this sequence.

As described above, only when the permission is acquired from all the input/output devices, the OS changes an address conversion table. Thus, it is possible to prevent inconsistency between address conversion tables held by the input/output devices and an address conversion table held by the OS when an address conversion table is changed.

INDUSTRIAL APPLICABILITY

As explained above, according to the invention, since the input/output device gives permission for page operation to the OS, the input/output device can hold authority for the page operation. It is guaranteed that an actual address held by an address conversion table of the input/output device is always correct without requesting the OS to perform the pin-down processing. An object of page-out processing is selected by reflecting input/output device access information on the selection. Thus, since a page with low significance is selectively paged out, it is possible to improve performance of the entire system.

In the conventional systems, the OS takes the initiative in performing page operation, determines permission or non-permission of the page operation, and performs the pin-down processing. On the other hand, in the invention, the input/output device determines permission or non-permission of page operation and performs the pin-down processing. Thus, it is possible to reduce an overhead of the pin-down processing every time input/output is performed.

In the conventional systems, a state of access from the input/output device is not reflected on selection of an object of the page-out processing at all. On the other hand, in the invention, an object of the page-out processing is selected by reflecting a state of access to a page from the input/output device on the selection. In this regard, possibility of showing performance higher than the conventional system is increased.

The invention claimed is:

1. An input/output device for transferring data between a memory of a computer having a virtual storage and a medium, comprising:
    an input/output device address converting section that holds an address conversion table for each process provided from a computer in order to convert a virtual address into an actual address, performs operation for the address conversion table in response to a request from the computer, and converts the virtual address into the actual address using the address conversion table when the input/output device accesses the memory;
    an input data analyzing section that analyzes data inputted from the medium and provides the computer with a result of the analysis;
    a data transfer section that transfers data using the actual address;
    a page operation permitting section that instructs the input/output device address converting section to operate the address conversion table in response to a request from the computer and notifies the computer of permission for page operation; and
    an input/output device access information managing section that records input/output device access information, which is a state of access from the input/output device to the memory, and provides the computer with the input/output device access state in response to a request from the computer, and in that when the page operation is the page-out processing, the page operation permitting section judges whether the page-out processing is permitted on the basis of the input/output device access information and, when it is judged that the page-out processing is permitted, instructs the input/output device address converting section to operate the address conversion table and notifies the computer of the permission of the page-out processing.

2. The input/output device according to claim 1, characterized in that the page operation is page-out processing, processing for deleting a virtual address space following termination of a process, and processing for changing a page.

3. A computer for controlling a process using a virtual storage and inputting data to and outputting data from media via input/output devices, comprising:
    an input/output area designating section that designates an input/output area, which is a memory area for performing input/output of data, with a virtual address;
    a computer address converting section that generates, for each process, an address conversion table for converting the virtual address, which indicates the memory area, into an actual address and provides the input/output devices with the address conversion table, performs operation for the address conversion table, and converts the virtual address into the actual address using the address conversion table when the computer accesses the memory;
    a page operating section that requests all the input/output devices to permit page operation and, when permission for the page operation is obtained from all the input/output devices, instructs the computer address converting section to operate the address conversion table and performs the page operation;
    a computer access information managing section that records computer access information, which is a state of access from the computer to the memory, and provides the computer access information as required; and
    a page-out object selecting section that acquires the computer access information from the computer access information managing section, acquires input/output device access information, which is a state of access from the input/output devices to the memory, from all the input/output devices, calculates significance of pages on the basis of the computer access information and all the pieces of input/output device access information, and selects a page with low significance as an object of page-out processing.

4. The computer according to claim 3, characterized in that the page operation is page-out processing, processing for deleting a virtual address space following termination of a process, and processing for changing a page.

5. The computer according to claim 3, characterized in that, in calculating the significance, the page out object selecting section weights the respective pieces of input/output device access information in accordance with weights of the respective input/output devices given in advance.

6. A computer system including input/output devices that transfer data and a computer that controls a process using a virtual storage and inputs data to and outputs data from a medium, the input/output devices comprising:

an input/output device address converting section that holds an address conversion table for each process provided from a computer in order to convert a virtual address into an actual address, performs operation for the address conversion table in response to a request from the computer, and converts the virtual address into the actual address using the address conversion table when the input/output device accesses the memory;

an input data analyzing section that analyzes data inputted from the medium and provides the computer with a result of the analysis;

a data transfer section that transfers data using the actual address;

a page operation permitting section that instructs the input/output device address converting section to operate the address conversion table in response to a request from the computer and notifies the computer of permission for page operation, and the computer comprising: an input/output area designating section that designates an input/output area, which is a memory area for performing input/output of data, with a virtual address; a computer address converting section that generates, for each process, an address conversion table for converting the virtual address, which indicates the memory area, into an actual address and provides the input/output devices with the address conversion table, performs operation for the address conversion table, and converts the virtual address into the actual address using the address conversion table when the computer accesses the memory; and a page operating section that requests all the input/output devices to permit page operation and, when permission for the page operation is obtained from all the input/output devices, instructs the computer address converting section to operate the address conversion table and performs the page operation; and an input/output device access information managing section that records input/output device access information, which is a state of access from the input/output device to the memory, and provides the computer with the input/output device access state in response to a request from the computer, and when the page operation is the page-out processing, the page operation permitting section judges whether the page-out processing is permitted on the basis of the input/output device access information and, when it is judged that the page-out processing is permitted, instructs the input/output device address converting section to operate the address conversion table and notifies the computer of the permission of the page-out processing.

7. The computer system according to claim 6, characterized in that the page operation is page-out processing, processing for deleting a virtual address space following termination of a process, and processing for changing a page.

8. The computer system according to claim 6, characterized in that:

the computer further comprises:

a computer access information managing section that records computer access information, which is a state of access from the computer to the memory, and provides the computer access information as required; and a page-out object selecting section that acquires the computer access information from the computer access information managing section, acquires input/output device access information, which is a state of access from the input/output devices to the memory, from all the input/output devices, calculates significance of pages on the basis of the computer access information and all the pieces of input/output device access information, and selects a page with low significance as an object of page-out processing.

9. The computer system according to claim 8, characterized in that, in calculating the significance, the page out object selecting section weights the respective pieces of input/output device access information in accordance with weights of the respective input/output devices given in advance.

10. A computer readable storage medium having an input/output control program stored therein to cause an input/output device to perform transfer of data between a memory and a medium in an OS having a virtual storage, the input/output control program causing the input/output device to execute operation comprising:

holding an address conversion table for each process that is provided from the OS in order to convert a virtual address into an actual address;

analyzing data inputted from the medium and providing a result of the analysis to the OS;

converting the virtual address into the actual address using the address conversion table when the input/output control program accesses the memory;

transferring the data using the actual address; operating the address conversion table in response to a request from the OS and notifying the OS of permission of page operation;

recording input/output device access information, which is a state of access to the memory from the input/output control program and providing the OS with the input/output device access state in response to a request from the OS, and in that when the page operation is the page-out processing, the input/output control program judges whether the page-out processing is permitted on the basis of the input/output device access information and, when it is judged that the page-out processing is permitted, instructs operation for the address conversion table and notifies the OS of the permission of the page-out processing.

11. The computer readable storage medium according to claim 10, characterized in that the page operation is page-out processing, processing for deleting a virtual address space following termination of a process, and processing for changing a page.

12. A computer readable storage medium having an OS stored therein to control a process using a virtual storage and input data to and output data from media via input/output control programs, the OS causing the computer to execute:

designating an input/output area, which is a memory area for performing input/output of data, with a virtual address;

generating, for each process, an address conversion table for converting the virtual address indicating the memory area into an actual address and providing the input/output control programs with the address conversion table;

converting the virtual address into the actual address using the address conversion table when the computer accesses the memory;

requesting all the input/output control programs to permit page operation;

and when permission for the page operation is obtained from all the input/output control programs, operating the address conversion table and performing the page operation;

recording computer access information, which is a state of access from the OS to the memory, and providing the computer access information as required; and acquiring the computer access information, acquiring input/output information access information, which is a state of access from the input/output control programs to the memory, from all the input/output control programs, calculating significances of pages on the basis of the computer access information and all the pieces of input/output device access information, and selecting a page with low significance as an object of the page-out processing.

13. The computer readable storage medium according to claim 12, characterized in that the page operation is page-out processing, processing for deleting a virtual address space following termination of a process, and processing for changing a page.

14. The computer readable storage medium according to claim 12, characterized in that, in calculating the significance, the OS weights the respective pieces of input/output device access information in accordance with weights of the respective input/output control programs given in advance.

15. A computer readable storage medium having therein a page management program including input/output control programs for transferring data and an OS for controlling a process using a virtual storage and inputting data to and outputting data from a medium, the input/output control programs causing a computer to execute operations comprising:
holding an address conversion table for each process that is provided from the OS in order to convert a virtual address into an actual address;
analyzing data inputted from the medium and providing a result of the analysis to the OS;
converting the virtual address into the actual address using the address conversion table when the input/output control program accesses a memory;
transferring the data using the actual address;
instructing operation for the address conversion table in response to a request from the OS and notifying the OS of permission of page operation; and
operating the address conversion table in response to a request from the OS, and
the OS including: designating an input/output area, which is a memory area for performing input/output of data, with a virtual address;
generating, for each process, an address conversion table for converting the virtual address indicating the memory area into an actual address and providing the input/output control programs with the address conversion table;
requesting all the input/output control programs to permit page operation; and when permission for the page operation is obtained from all the input/output control programs, operating the address conversion table and performing the page operation; wherein the input/output control program further comprises recording input/output device access information, which is a state of access to the memory from the input/output control program and providing the OS with the input/output device access state in response to a request from the OS, and in that when the page operation is the page-out processing, the input/output control program judges whether the page-out processing is permitted on the basis of the input/output device access information and, when it is judged that the page-out processing is permitted, instructs operation for the address conversion table and notifies the OS of the permission of the page-out processing.

16. The computer readable storage medium according to claim 15, characterized in that the page operation is page-out processing, processing for deleting a virtual address space following termination of a process, and processing for changing a page.

17. The computer readable storage medium according to claim 15, characterized in that the OS further comprises:
recording computer access information, which is a state of access from the OS to the memory, and providing the computer access information as required; and
acquiring the computer access information, acquiring input/output information access information, which is a state of access from the input/output control programs to the memory, from all the input/output control programs, calculating significances of pages on the basis of the computer access information and all the pieces of input/output device access information, and selecting a page with low significance as an object of the page-out processing.

18. The computer readable storage medium according to claim 17, characterized in that, in calculating the significance, the page management program weights the respective pieces of input/output device access information in accordance with weights of the respective input/output control programs given in advance.

19. A page management method in a computer system including input/output devices for transferring data and a computer for controlling a process using a virtual memory and inputting data to and outputting data from a medium, the page management method comprising:
generating, for each process, an address conversion table for converting a virtual address, which indicates the memory area, into an actual data in the computer and providing the input/output devices with the address conversion table;
holding the address conversion table for each process provided from the computer in the input/output devices;
analyzing data inputted from the medium in the input/output devices and providing the computer with a result of the analysis;
designating an input/output area, which is a memory area for performing input/output of data, with a virtual address;
converting the virtual address into the actual address using the address conversion table when the input/output devices access the memory;
transferring data using the actual address; requesting all the input/output devices to permit page operation in the computer;
operating the address conversion table in response to a request from the computer in the input/output device and notifying the computer of permission of the page operation;
operating the address conversion table in the computer when permission for the page operation is obtained from all the input/output devices and performing the page operation; and
recording input/output device access information, and when the page operation is a page-out processing, judging whether the page-out processing is permitted on basis of the input/output device access information and, when it is judged that the page-out processing is permitted, instructs operation for the address conversion table and notifies the computer of the permission of the page-out processing.

* * * * *